Jan. 30, 1923.

M. BECK.
FLYING MACHINE.
FILED APR. 7, 1921.

Inventor
Michael Beck
By his Attorneys

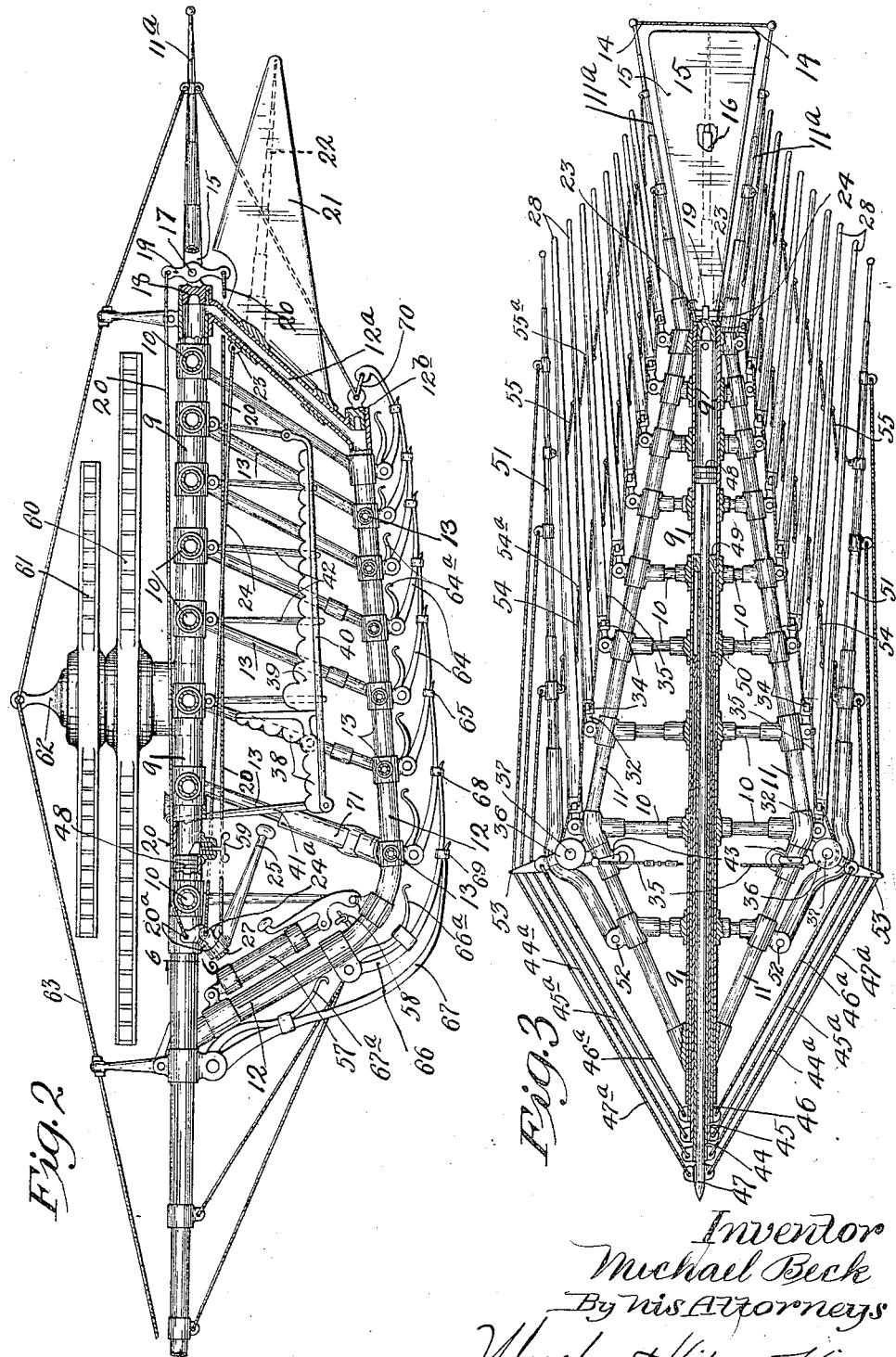

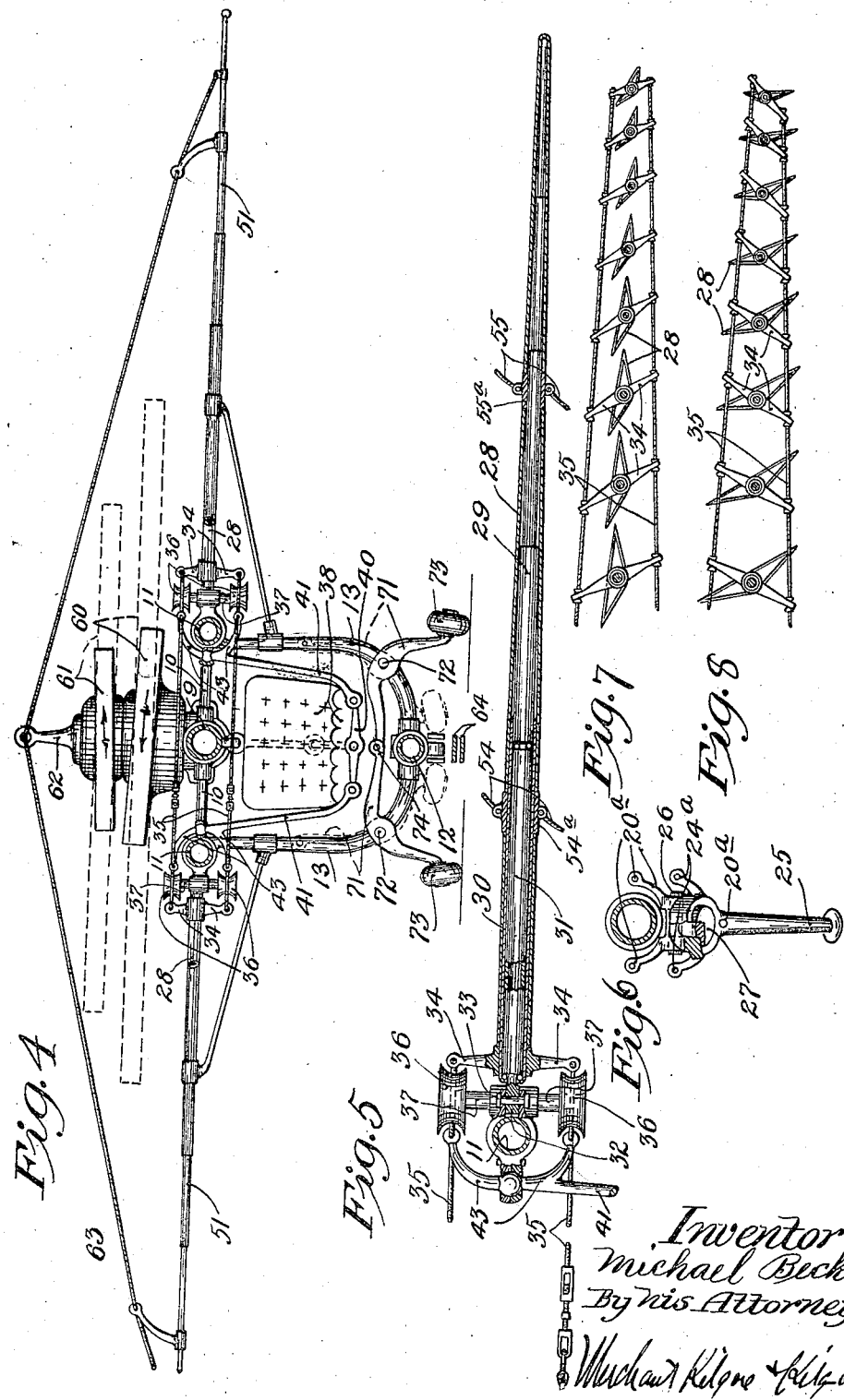

Patented Jan. 30, 1923.

1,443,519

UNITED STATES PATENT OFFICE.

MICHAEL BECK, OF MINNEAPOLIS, MINNESOTA.

FLYING MACHINE.

Application filed April 7, 1921. Serial No. 459,319.

*To all whom it may concern:*

Be it known that I, MICHAEL BECK, a citizen of the United States, residing at Minneapolis, in the county of Hennepin and State of Minnesota, have invented certain new and useful Improvements in Flying Machines; and I do hereby declare the following to be a full, clear, and exact description of the invention, such as will enable others skilled in the art to which it appertains to make and use the same.

My invention relates to flying machines of the heavier-than-air type, and combines, in a novel manner, sustaining planes and propelling wheels such as used in the type of flying machine known as gyrocopters. Moreover, the invention includes novel features in certain of the planes that are made up of adjustable blades adapted to be set at various angles and which co-operate with the elevating propellers, in a novel way. Also, the invention involves automatic stabilizing means for preventing the plane from capsizing laterally while in flight.

The above features, as well as certain other novel features, will be hereinafter described and defined in the claims.

In the accompanying drawings, which illustrate the invention, like characters indicate like parts throughout the several views.

Referring to the drawings:

Fig. 2 is a side elevation of the machine with some parts sectioned;

Fig. 3 is a plan view with some parts sectioned, showing the extensible wing planes folded;

Fig. 4 is a transverse vertical section taken approximately on the line 4—4 of Fig. 1;

Fig. 5 is an enlarged vertical section taken approximately on the line 5—5 of Fig. 1;

Fig. 6 is a fragmentary section taken on the line 6—6 of Fig. 2; and

Figs. 7 and 8 are sections taken approximately on the line 7—8 of Fig. 1, illustrating different positions of the blades of the so-called wing planes.

Figure 1:
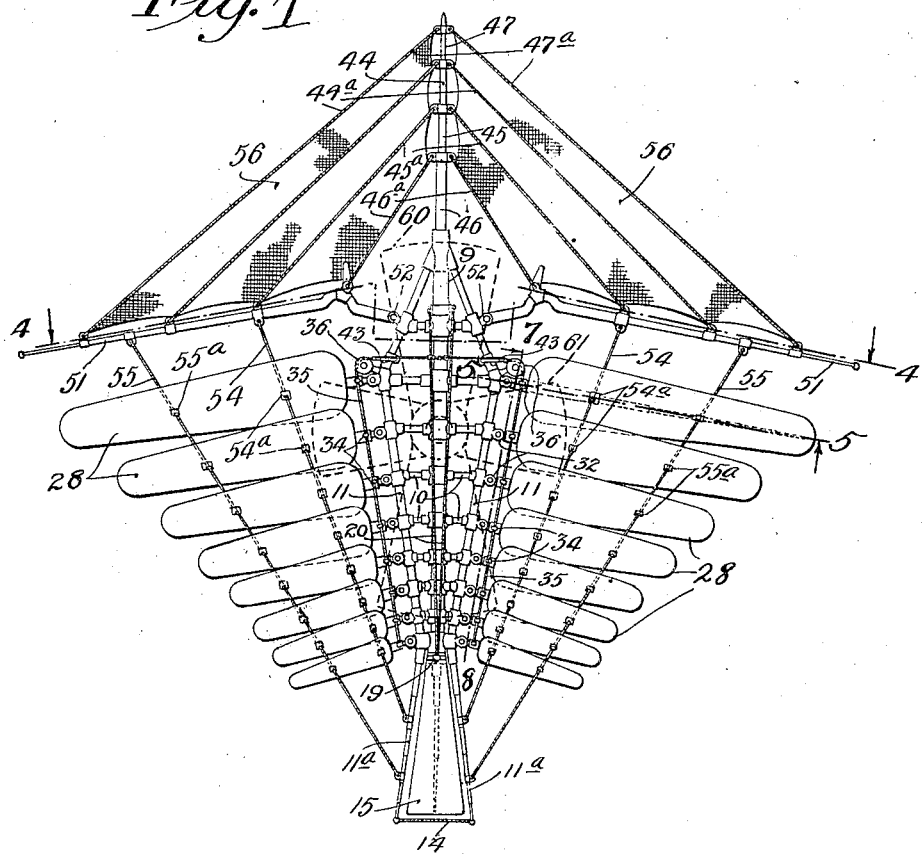
Fig. 1 is a plan view showing the complete flying machine.

The main frame of the machine is of novel and peculiar construction, and, as shown, it comprises as follows: The numeral 9 indicates a long tube that affords a longitudinal cylinder and the ridge member of said frame. This tube 9 is connected by tubular struts 10 to reversely bulged angular side frame tubes 11, the ends of which are attached rigidly to said tube 9. A runner-like lower frame tube 12, at its front and rear ends, is rigidly attached to the tube 9 and is connected to the side tubes 11 by reversely bowed rib-forming tubes 13. The bars or tubes 11 have rearwardly converging fixed rear end extensions 11$^a$ shown as tied together at their extended ends by a cable or cross brace 14, and working in the space between these extensions 11$^a$ is an elevating rudder 15 secured to a rudder-supporting shaft 16 pivoted at 17, for vertical movements, to a bearing 18 on the rear end of the ridge or central tube 9. The rudder shaft 16, at its pivoted end, has upwardly and downwardly extended arms 19 to which the rear ends of operating cables 20 are attached.

The numeral 21 indicates a steering rudder, the shaft 22 of which and the lower front portion of which rudder are pivoted or mounted for oscillatory swinging movements on the oblique rear portion 12$^a$ of the lower frame tube 12. Said rudder shaft 22, at its front end, (see Figs. 2 and 6), is provided with oppositely projecting arms 23, to which the rear ends of operating cables 24 are attached, so that by operating said cables, the rudder 21 may be swung laterally in either direction to and from a central position to thereby control the direction of flight of the machine.

For manipulating the two rudders 15 and 21 through the cables 20 and 24, I provide a single or common controlling lever 25. This lever 25 is connected to the intermediate forward portion of the frame tube 9 by means of two pivots 26 and 27, (see Figs. 2 and 6). The pivot 26 permits the lever 25 to be moved in a vertical plane and the pivot 27 permits the same to be oscillated laterally. Cables 20 and 24 are connected to lever 25, respectively, at 20$^a$ and 24$^a$.

Obviously, with the connections described, vertical movements of the controlling lever 25 will raise and lower the elevating rudder 15, while lateral movements of said lever will oscillate the steering rudder 21. Hence, the flight of the machine may be controlled by manipulation of said lever 25.

The side planes of this flying machine are of a type which may be designated as wing planes. Each such wing plane is made up of a plurality of adjustable wing blades 28 that decrease in length and width in a direction from the front toward the rear of the machine. The wing blades 28 are preferably thin hollow sheet metal or steel shells and are rigidly secured to stiffening ribs 29 and to an inner end sleeve 30. The sleeves 30 are swiveled on non-rotary shafts 31, the reduced necks of which extend through the contracted ends of the tubes 30 and terminate in flattened heads 32 pivotally connected at 33 to lugs on the side tubes 11, (see particularly Figs. 3 and 5). The sleeves 30, at their inner ends, are provided with oppositely projecting arms 34 that are attached to the outer ends of wing-operating cables 35. The upper cables 35 connect all of the upper arms 34 of the several wing blades on both sides of the machine, while the lower cable 35 connects all of the lower arms 34 of the several wing blades on opposite sides of the machine. Said cables 35 extend partly around guide sheaves 36 loosely mounted on studs 37 supported by the side tubes 11.

The wing blades 28 are thus mounted for swivelling or oscillatory angular movements on the axis of the non-rotary shafts 31 and, hence, may, by manipulation of the cables 35, be set in various different angular positions, such extreme positions being shown in Figs. 7 and 8.

I provide novel means for operating the wing blades 28 on opposite sides of the machine in such manner as to stabilize the flight of the machine, and, as a means for rendering this action automatic, I provide a gravity-suspended pilot's or operator's seat and connections between the same and the wing blade operating cables 35.

The operator's seat 38, as shown, is combined with a couch 39, the two being secured to a framework 40 and combined as a sort of a hammock structure, said frame 40 being pivoted to the lower ends of hanger links 41 and 42. Said hanger links 41 and 42 are pivoted at their upper ends to suitable bearings on the opposite frame tubes 11, and the front links 41 are provided at their upper ends each with upper and lower arms 43. The upper arms 43 are connected to the upper operating cables 35, while the lower arms 43 are connected to the lower cables 35.

Working telescopically within the main tube 9, are three telescoped tubes 44, 45 and 46, and working within the inner tube 44, is a rod 47. This rod 47, at its inner end, has a piston head 48 that works within the tube 9, and likewise, the tubes 44, and 45 have piston-like heads 49 and 50.

The numeral 51 indicates a pair of laterally spaced spreader arms, which arms, at their front ends, are pivoted to the front portions of the frame bars 11 at 52.

The front ends of the tubes 44, 45 and 46 are connected by cables 44$^a$, 45$^a$ and 46$^a$ to lugs located on different points on the co-operating spreader arms 51, and likewise, the front end of the rod 47 is connected by cables 47$^a$ to lugs located still farther out on said arms 51.

When air or other expansive fluid is introduced into the rear end of the cylinder-acting tube 9, the rod 47 will be forced forward and, in succession, the tubes 44, 45 and 46 will be picked up by the piston heads 48 and extended, as shown in Fig. 1. Here it may be noted that the cables 44$^a$, 45$^a$ and 47$^a$ are passed through outstanding guide arms 53 on the spreader arms 51.

When the said tubes and rod are forwardly projected, as shown in Fig. 1, they pull the spreader arms 51 into outstanding position, and, the latter pull taut, wing-spreading cables 54 and 55. These cables 54 and 55, at their front ends, are attached to the spreader arm 51 and, at their rear end, to the extension bars 11$^a$, and, at their intermediate portions, are attached to bearing sleeves 54$^a$ and 55$^a$ respectively. The said sleeves 54$^a$ and 55$^a$ are swivelled on the wing ribs 29 and are stuck in openings, formed in the angularly adjustable wing-blades 28.

Flexible front planes 56, preferably of a suitable fabric, are attached to the cables 44$^a$, 45$^a$, 46$^a$ and 47$^a$ and are arranged to be spread horizontally and drawn taut when the rod 47 and co-operating tubes are projected or forwardly extended, as shown in Fig. 1.

For supplying fluid, preferably compressed air, to the rear end of the tube 9, for the purposes stated, I have shown a hand-operated air-pump 57 shown as applied to the front portion of the frame tube 12 and arranged to deliver air thereinto and through the rear tube 12$^a$ into the rear end of said tube 9. The numeral 58 indicates a vent-cock for letting air out of said tube. The numeral 59 indicates a spring-pressed plunger which, when released, will lock the piston head 48 forward, as shown in Fig. 2, and which plunger must be retracted before said piston head and co-operating parts can be restored to their retracted position.

For lifting the machine vertically, I provide a plurality of propeller blades mounted to rotate on vertical axes, the one preferably rotating in one direction, and the other in the opposite direction. These propellers will be rotated by power afforded in any suitable way, but preferably, the said propellers are combined propellers and internal combustion rotary engines of the type disclosed and claimed in my pending application S. N. 416,744 of date Oct. 13, 1920. As shown, these two propellers 60 and 61 are journaled on a vertical spindle 62, supported on, and rising from the intermediate portion of the main tube 9 and suitably braced by cables 63, or the like. In Fig. 2, the propellers 61 and 62 are viewed in a direction showing longitudinal edges thereof, while in Fig. 4, the ends of the propeller blades are shown in full lines and their lengths by dotted lines. In the machine, as preferably designed, I provide a resilient alighting runner, which as shown, is made up of a plurality of curved runner sections 64, pivoted to the under side of the frame tube 12 and having sliding connections at 65. A longer curved runner section 66 is pivoted to the front portion of the tube 12 and a still longer runner section 67 is pivoted, at its upper end, to the front end of the main tube 9. The runner section 66 has a sliding connection with the front runner sections 64 at 68 and the end of runner section 67 has sliding connection with section 66 at 69. The rearmost runner section 64 is connected to the plug $12^b$ with the rear end of tube 12 by link 70. Runner sections 64, 66 and 67 are provided with spring arms $64^a$, $66^a$ and $67^a$, but are engageable with the tube 12 to cushion the alighting action.

To steady the machine and hold it upright, when it is on the ground, two bell crank arms 71 are provided, pivoted to one of the ribs 13 at 72, and provided, at their outer ends, with small ground engaging wheels 73. When the arms 71 are set for operation, their inner end will be adapted to be connected by a pin or bolt 74 (see Fig. 4), but the said arms may be turned into inoperative positions indicated by dotted lines in Fig. 4 when the pin 74 is removed.

While the propellers 60 and 61 are preferably of the type above stated, they may, nevertheless, be of any suitable type and may be driven in any suitable way or by any suitable means, but ought to be rotated in opposite directions so that the torque produced by the one will be offset by the torque produced by the other. Both propellers, when in operation, will, of course, tend to lift the entire machine and that will produce partial vaccum above the propellers and produce a downward blast of air below the propellers. This downward blast of air will, in part, be directed unobstructedly downward, but a very considerable part thereof will be delivered directly on the obliquely set wing blades or planes 28. The effect of this blast on said wing blades will be to cause the machine to travel forward and the speed of forward travel will depend on the angle at which said blades are set. The greater the angle of said blades to a horizontal, the greater will be the lifting action, and the greater will be the forward propelling action, (see Fig. 8), and, conversely, the less the angle of the blades to a horizontal, the less will be the lifting action and the less the forward propelling action, (see Fig. 7), but, of course, the more rapid the advance of the machine, the greater may be the climbing action of the machine due to the action of the complete wing planes and front plane due to traveling motion.

The manner in which the blades of the wing planes are adjusted automatically to prevent the machine from capsizing laterally, has already been indicated, but attention is further called to the fact that, if the wing on one side is thrust downward, the weight of the person on the operator's seat, operating through the connections described, will more closely close up the blades on the low side and open up the blades on the opposite or high side, thus stabilizing the machine and keeping the same approximately transversely horizontal throughout its flight. This machine is, therefore, especially adapted for commercial use rather than trick or exhibit flying.

Attention is further called to the important fact that the seat and couch-supporting links 41 and 42 are mounted also for forward and rearward swinging movements, so that if the flying machine tends to nose downward, the elevating rudder 15 will be raised, thereby tending to bring the plane back to horizontal position and, on the other hand, if the machine tends to nose upward, said elevator frame will be lowered, tending to bring the plane back to horizontal position.

What I claim is:—

1. A flying machine having wing planes each of which is made up of a plurality of wing blades movable from in-operative positions into extended operative positions, and means for angularly adjusting said wing blades when thus extended.

2. A flying machine having wing planes each of which is made up of a plurality of wing blades movable from in-operative positions into extended operative positions, means for angularly adjusting said wing blades when thus extended, and elevation propellers operative adjacent to said wing planes.

3. A flying machine having wing planes each of which is made up of a plurality of wing blades movable from in-operative positions into extended operative positions, means for angularly adjusting said wing blades when thus extended, and a rotary propeller operative on approximately a horizontal axis and working above said wing planes.

4. A flying machine having wing planes each of which is made up of a plurality of wing blades movable from in-operative positions into extended operative positions, means for angularly adjusting said wing blades when thus extended, and a horizontal front plane extended ahead of said wing planes.

5. A flying machine having wing planes movable from in-operative positions into extended operative positions, means for angularly adjusting said wing planes when thus extended, a horizontal front plane extended ahead of said wing planes, said front plane having a collapsible and extensible support, and means for holding said support extended.

6. A flying machine having wing planes movable from in-operative positions into extended operative positions, means for angularly adjusting said wing planes when thus extended, a horizontal front plane extended ahead of said wing planes, said front plane having a collapsible and extensible support, and means for holding said support extended, said means comprising a cylinder and a piston.

7. A flying machine having wing planes movable from in-operative positions into extended operative positions, means for angularly adjusting said wing planes when thus extended, a horizontal front plane extended ahead of said wing planes, said front plane having a collapsible and extensible support, and means for holding said support extended, said means comprising a cylinder and a piston, said cylinder being one of the frame tubes of the machine.

8. A flying machine having wing planes movable from in-operative positions into extended operative positions, means for angularly adjusting said wing planes when thus extended, a horizontal front plane extended ahead of said wing planes, said front plane having a collapsible and extensible support, means for holding said support extended, said means comprising a cylinder and a piston, said cylinder being one of the frame tubes of the machine, and means for forcing air into said frame tube and for discharging the same at will.

9. A flying machine having angularly adjustable wing planes, a gravity-hung seat, and connection whereby said seat will reversely operate the opposite wing planes to steady the machine and prevent lateral capsizing thereof, the said wing planes being foldable against the side of the machine.

10. A flying machine having angularly adjustable wing planes, a gravity-hung seat, connection whereby said seat will reversely operate the opposite wing planes to steady the machine and prevent lateral capsizing thereof, the said wing planes being foldable against the side of the machine, an extensible front plane, and means for simultaneously extending said wing planes and front planes.

11. A flying machine having angularly adjustable wing planes, a gravity-hung seat, connection whereby said seat will reversely operate the opposite wing planes to steady the machine and prevent lateral capsizing thereof, the said wing planes being foldable against the side of the machine, an extensible front plane, and means for simultaneously extending said wing planes and front planes, said means comprising a cylinder and a piston, which piston is a tubular member of the frame of the machine.

In testimony whereof I affix my signature.

MICHAEL BECK.